United States Patent [19]

Frank et al.

[11] Patent Number: 4,524,524
[45] Date of Patent: Jun. 25, 1985

[54] GAGE FOR MEASURING DIAMETERS

[75] Inventors: Jimmy I. Frank; John R. Wolfe, III, both of Pasadena, Tex.

[73] Assignee: Gagemaker, Inc., Pasadena, Tex.

[21] Appl. No.: 539,168

[22] Filed: Oct. 5, 1983

[51] Int. Cl.³ .............................. G01B 5/08; G01B 5/12
[52] U.S. Cl. ............................... 33/147 M; 33/199 R
[58] Field of Search ............ 33/143 F, 147 H, 147 K, 33/147 M, 174 E, 199 R

[56] References Cited

U.S. PATENT DOCUMENTS

| 129,349 | 7/1872 | Kellogg | 33/174 E |
|---|---|---|---|
| 2,210,561 | 8/1940 | Allen et al. | 33/199 R |
| 2,826,822 | 3/1958 | Noviant | 33/199 R |
| 2,874,475 | 2/1959 | McGaffey | 33/174 E |
| 2,911,725 | 11/1959 | Sleigh | 33/199 R |
| 2,943,394 | 7/1960 | Schabot | 33/147 K |
| 3,090,126 | 5/1963 | Kernoski | 33/199 R |
| 4,148,146 | 4/1979 | Holland | 33/199 R |
| 4,189,843 | 2/1980 | Baldwin | 33/199 R |
| 4,202,109 | 5/1980 | Schasteen | 33/199 R |

FOREIGN PATENT DOCUMENTS 1100980  3/1961  Fed. Rep. of Germany .... 33/199 R

OTHER PUBLICATIONS

Dorsey Gage Co., "Large Diameter-Shallow Bore-I.D. & O.D. Gages".
Coulter-Mustang Services Co., "Accu Thread Gauging System", 1982, 8 pages.
Ames, "9150 Series, 9680 Series", 3 pages.
Mueller, "Pitch Diameter Gages", 9-1981, 3 pages.

Primary Examiner—Richard R. Stearns
Attorney, Agent, or Firm—Arnold, White & Durkee

[57] ABSTRACT

A gage and method are disclosed for measuring the inside or outside diameter of a product at a selected distance from the end of the product. The gage has a pair of blocks slidable along a pair of parallel vertical guide rails. Each block has a bearing pad which can be positioned against the end of the product to be measured. An arm extends horizontally from each block and is slidably mounted in an aperture extending through the block. A contact depends vertically from the end of each arm. One contact is mounted on a vertically reciprocable dial indicator plunger. The contacts are first positioned horizontally and vertically using gage blocks which correspond to the specified diameter and distance from the end of the pipe. The gage is then positioned against the end of the product and the contacts are brought into contact with the surface of the product at diametrically opposed points thereon. The dial indicator displays the deviation of the actual diameter from the specified diameter. This gage and method are particularly adapted to measuring pitch diameters of internally or externally, tapered or straight, threaded products.

21 Claims, 8 Drawing Figures

GAGE FOR MEASURING DIAMETERS

BACKGROUND OF THE INVENTION

This invention relates to gages for measuring inside and outside diameters of tubular products and tubular portions of products, the outside diameters of solid goods, or the inside diameter of circular apertures, the surfaces of which may be smooth or threaded and straight or tapered. In the particular embodiment disclosed herein, this invention concerns a gage which is particularly adapted for measuring the pitch diameter of internally or externally, straight or tapered pipe threads at any desired distance from the end of the pipe.

Various components used in the oil and gas production industry are provided with threads at their ends to join one to another. These components include line pipe, casing, tubing, couplings, rotary joints, and all other connections. The threads may be straight or tapered, and the thread form may be of the round or buttress type, or any other thread form used in the petroleum industry, including premium connections.

For use in the field, it is important for proper performance and extended service life of the components that the joints between the various components be strong, durable, and tight. This requires that the threads used to form these joints be fabricated with precision. This is particularly important for tapered thread.

To obtain high precision, it is desirable that thread sizes and configurations for threaded components used in oil and gas production as well as other applications be standardized for the particular industry so that quality control can be uniformly maintained throughout the industry. In the oil and gas production industry, the American Petroleum Institute (API) has adopted a specification for threading, gaging and thread inspection of components used in the petroleum production industry. This specification sets forth standard dimensions for pitch diameters for the various types and sizes of tubing and pipe threads corresponding to a range of pipe and tubing diameters. The specification also sets forth the distance from the end of the threaded member to the point on the tapered thread where the standard pitch diameter is to be measured.

In addition to specifying the standard pitch diameter dimensions, the API specification also sets forth a procedure for checking the accuracy of the actual pitch diameter of the threaded product compared to the standard pitch diameter. This procedure, which is universally accepted and used by the petroleum production industry, utilizes a series of ring and plug gages to check the accuracy of the pitch diameter against the API standard pitch diameter for the particular thread configuration and pipe size. This series of gages includes a plug and mating ring for each thread configuration covered by the API specification. These thread configurations vary by pipe diameter size, taper, pitch and type of thread, e.g., round or buttress. The total number of thread configurations covered by the API's specification amounts to some 60 configurations, and a manufacturer desiring to fabricate all of these thread configurations therefore needs a like number of plug and mating ring pairs. This number, of course, does not include the many non-API thread forms now in use.

Further, the API specification also requires the manufacturer to have two different sets of plug and mating ring pairs, a set of reference master gages and a set of working gages. The working gages are used for actually gaging the product threads, while the reference master gages are used mainly to periodically check the accuracy of the working gages and only rarely to check the product threads. Because the rings and plugs are made of relatively expensive materials and require substantial machining to very precise tolerances, a complete set of plugs and mating rings costs hundreds of thousands of dollars. Also, the threads of the rings and plugs eventually wear out from repeated use, necessitating replacement.

Ring and plug gages are used to check the accuracy of the pitch diameter at a particular point from the end of a pipe as specified by the API specification. Ring and plug gages do not, however, directly measure the pitch diameter of a product thread at the specified distance from the pipe end. Rather, the ring or plug is threaded onto the product threads until hand tight engagement is achieved. Then the so-called standoff of the ring or plug from the pipe is checked against a standoff defined by the API specification. For a plug, which is used to check internal threads, the standoff is the distance from a step portion of the plug to the nose of the product. For a ring, the standoff is measured from the nose of the product to the rear end of the ring. Both standoffs are checked against a corresponding distance for the reference plug and ring pair in hand tight engagement, and both must fall within a tolerance as compared to the reference plug and ring standoffs as established by the API. Thus this gaging system only provides a comparison between actual standoff to a reference standoff.

As a result, the ring and plug gaging system established by the API possesses certain inherent shortcomings. Rings and plugs do not directly measure pitch diameter. Nor do they indicate whether the thread is out of round, i.e., ovality. Further, ring and plug gages are capable of measuring standoff to an accuracy of only about 1/64th of an inch. Finally, the position attained by hand tight engagement of the ring or plug may be affected by any of the following: damaged or distorted threads, improper thread form, incorrectly machined thread elements, ovality, cleanliness, or excessive lubrication.

Others have attempted to provide a pitch diameter gage which eliminates the need for a set of ring and plug gages. For example, such a gage is shown in U.S. Pat. No. 4,189,843 to Baldwin. However, this gage does not provide any precise quantitative measure of the deviation in pitch diameter from the standard. Nor does it specifically measure the pitch diameter at a selected axial distance from the end of the pipe, specifically the pitch diameter at the distance from the end of the pipe as specified by the API specification.

SUMMARY OF THE INVENTION

According to the present invention, there is provided a method and gage for measuring diameters which substantially overcomes the shortcomings of prior methods and gages.

According to one embodiment of the invention, there is provided a method of measuring the inside or outside diameter of a straight or tapered product at a selected distance from the end of the product. First, an upper contact and a lower contact are set at a predetermined horizontal distance from a vertical bearing surface, the horizontal distance being measured in a vertical plane which is perpendicular to the bearing surface. The predetermined horizontal distance is based on the axial distance from the end of the product to the point on the product at which the diameter is to be measured. The upper and lower contacts are then initially set a predetermined vertical distance apart based on a specified diameter at the selected axial distance. The bearing surface is placed against the end of the product, and the contacts are brought into contact with the surface of the product at diametrically opposed points on the product. Finally, the difference between the vertical distance initially set and the vertical distance from the upper contact to the lower contact when in the surface contacting position is measured.

In another aspect of the method of the present invention, the predetermined horizontal distance between the upper and lower contacts and the bearing surface is set using a setting standard accurately dimensioned to the predetermined horizontal distance. The predetermined vertical distance is set using a setting standard accurately dimensioned to the predetermined vertical distance.

In still another aspect of the method, the surface of the product is threaded.

In a further aspect of the method of the present invention, the difference between the initially set vertical distance and the vertical distance from the upper contact to the lower contact in the surface contacting position is measured by a dial indicator in communication with the upper contact. The upper contact is vertically movable from its initially set vertical position to the surface contacting position. The dial indicator is capable of indicating the vertical distance traveled by the upper contact from its initially set vertical position to its surface contacting position.

In another embodiment of the invention, there is provided a gage for measuring the inside or outside diameter of a straight or tapered product, at a selected distance from the end of the product. The gage has a substantially flat vertical bearing surface contactable with the end of the product. Upper and lower contacts lie in another vertical plane which is perpendicular to the bearing surface. The contacts are movable horizontally and vertically in that vertical plane. The gage has means for locking the horizontal distance from the bearing surface to the upper contact and to the lower contact. This horizontal distance is measured in the vertical plane in which the contacts lie and is based on the selected distance from the end of the product. The gage also has means for initially setting the vertical distance between the upper contact and the lower contact. This vertical distance is based on the specified diameter at the selected distance. Further, the gage includes means for bringing the upper and lower contacts into contact with the surface of the product at diametrically opposed points thereon and means for measuring the difference between the initially set vertical distance and the distance between the upper and lower contacts in the surface contacting position.

In another aspect of the gage according to the present invention, the gage has a pair of parallel elongated vertical guide rails and an upper block and a lower block mounted on and slidable along the guide rails. The upper and lower blocks can be locked into a desired position on the guide rails by locking means. Each block has a substantially flat bearing surface. The bearing surfaces lie in the same vertical plane and are contactable with the end of a product to be measured. An upper arm is slidably mounted in and extends horizontally from the upper block and a lower arm is slidably mounted in and extends horizontally from the lower block. The upper and lower arms lie in a vertical plane which is perpendicular to the vertical plane of the bearing surfaces. The upper and lower arms can be locked in a desired position relative to the upper and lower blocks, respectively, by locking means. An upper contact depends from an end of the upper arm remote from the upper block and a lower contact depends from an end of the lower arm remote from the lower block. The contacts are contactable with the surface of the product at diametrically opposed points on the surface. The vertical distance between the contacts can be initially set to a distance based on a specified diameter at the selected distance, and similarly the horizontal distance from the upper contact to the upper bearing surface and the horizontal distance from the lower contact to the lower bearing surface can be set to a distance based on the horizontal distance from the end of the product at which the diameter is to be measured. The gage is also provided with means for measuring the difference between the initially set vertical distance and the vertical distance between the contacts when in the surface contacting position.

In a further aspect of the gage, the surface of the product is threaded.

In another aspect of the gage of the present invention, the various locking means comprise screws threaded into the upper and lower blocks. The measuring means comprises a dial indicator rigidly mounted on the upper arm at the remote end. The dial indicator has a reciprocable plunger extending vertically therefrom, with the upper contact being mounted on the plunger.

In a further aspect of the gage of the present invention, the upper and lower blocks may be reversed on the guide rails between an outside diameter measuring position in which the contacts extend from the arms vertically toward each other and an inside diameter measuring position in which the contacts extend from the arms vertically away from each other.

In still another aspect of the gage of the present invention, each contact comprises a shoe pivotable about a horizontal axis lying in a plane parallel to the vertical plane of the bearing surfaces. The shoe has a flat edge which is contactable with the surface of the product and with the crests of the threads when the product is threaded.

In still a further aspect of the gage of the present invention, each contact comprises a contact ball which is contactable with the surface of the product and with the flanks of a thread valley when the product is threaded.

It is therefore an advantage of the present invention that the method and gage provided permit direct and accurate measurement of the pitch diameter at any desired point along an internal or external tapered thread.

Another advantage is that the method and gage of the present invention can be used to accurately check the ovality of a circular surface.

A further advantage is that the simplicity of the method and gage of the present invention permit use for field or manufacturing inspection of pipe threads.

Still another advantage is that the gage of the present invention can be used in conjunction with a standard "shave gage," which verifies that the pitch line datum to thread crest dimension is accurate.

A still further advantage of the present invention is that a pitch diameter measuring system is provided which is relatively inexpensive compared to a set of standard API rings and plugs.

Yet another advantage is that a pitch diameter can be checked with greater accuracy than with ring and plug gages.

A still further advantage is that the gage and method provided can be used on nonthreaded, smooth surfaces to check inside or outside diameters.

These and other advantages will be more fully appreciated and apparent from the following detailed description of the invention.

DETAILED DESCRIPTION OF THE PREFERRED EMBODIMENTS

Figure 1:
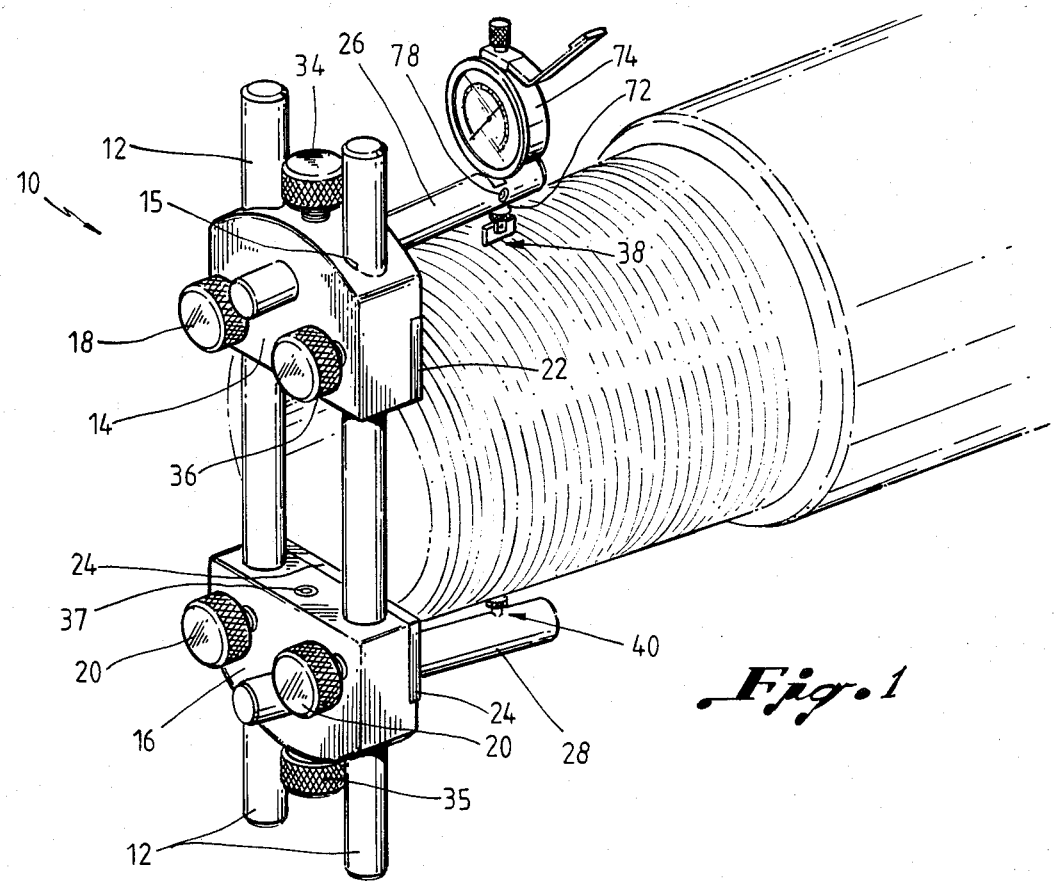
FIG. 1 is a perspective view of a gage according to the invention positioned on an externally threaded pipe.
Figures 2, 3:
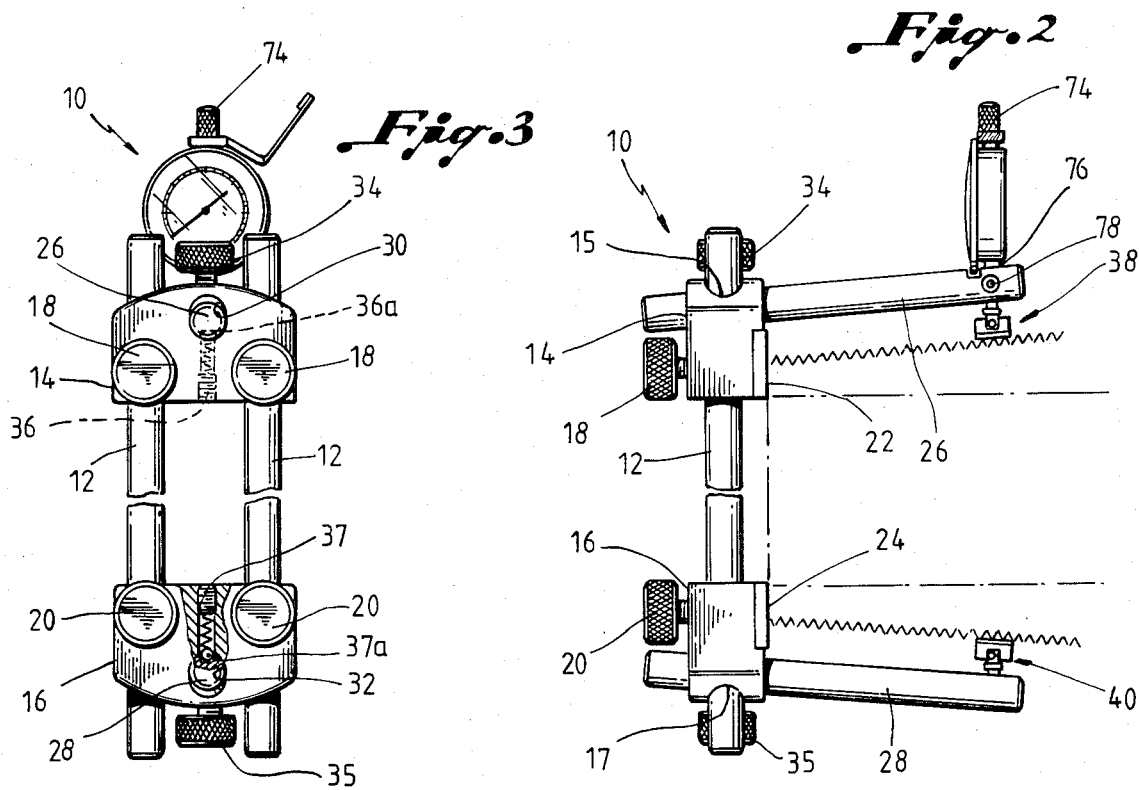
FIG. 2 is a sectional view through an externally threaded pipe showing the gage in position.
FIG. 3 is an end elevational view of the gage of FIG. 1.

Referring first to FIGS. 1, 2, and 3, there is shown one preferred embodiment of the gage according to the present invention. The gage 10 has a pair of parallel guide rails 12 on which are slidably mounted an upper block 14 and a lower block 16. Upper block 14 has a pair of passageways 15 and lower block 16 has a pair of passageways 17 through which guide rails 12 extend and slide.

A pair of locking screws 18 are threaded into apertures which extend through the upper block to passageways 15. Likewise, a pair of locking screws 20 are threaded into apertures which extend into passageways 17 of lower block 16. Locking screws 18, 20 can be threaded into the blocks until the forward ends of the screws bear against parallel guide rails 12 in order to position the upper and lower blocks 14, 16 relative to the guide rails. The forward ends of screws 18, 20 are preferably made of brass to prevent any damage to guide rails 12.

As shown in FIG. 2, upper block 14 has a bearing pad 22 and lower block 16 has a bearing pad 24. These bearing pads lie in the same vertical plane to define a flat, planar surface which can be positioned against the end of the pipe or tubular member to be measured. As will be explained later, it is important to the operation of gage 10 that the location of the planar surface defined by bearing pads 22, 24 be precisely known. The bearing pads therefore have precisely ground surfaces. Further, because these surfaces may become worn through repeated contact with pipe ends in service, it is desirable that the bearing pads be removable so that they may be periodically replaced.

An upper arm 26 and a lower arm 28 extend from upper block 14 and lower block 16, respectively, in a plane perpendicular to the vertical plane defined by the bearing pads. Upper arm 26 is positioned and slidable in an inclined aperture 30 extending through upper block 14. Likewise, lower arm 28 is positioned and slidable in an inclined aperture 32 extending through lower block 16. An upper arm locking screw 34 is threaded into an aperture extending into the upper block to aperture 30, and a lower arm locking screw 35 is threaded into an aperture in the lower block extending into aperture 32. These locking screws can be threaded into their respective blocks until the forward ends of the screws snugly bear against arms 26, 28. Preferably, the forward ends of the screws are made of brass so that the arm surfaces are not damaged.

Also mounted in the upper and lower blocks 14, 16, respectively, is an upper and a lower ball spring plunger 36, 37, each of which is biased into a V-notch groove 36a, 37a cut longitudinally in the upper and lower arms, respectively. Upper and lower arms 26, 28 are prevented from being rotated in apertures 30, 32 in normal operation of the gage by the ball spring plungers.

Figure 4:
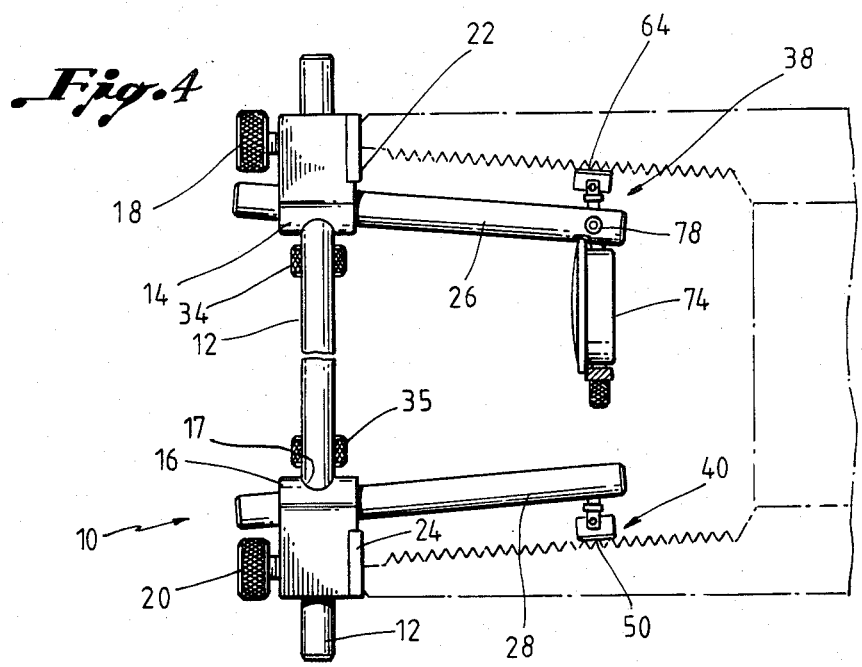
FIG. 4 is a sectional view through an internally threaded pipe showing the gage in position.

In comparing FIGS. 2 and 4, it can be seen that gage 10 can be used to measure both internal and external diameters, such as the tapered threads shown. With the gage in the external thread measuring position of FIG. 2, an upper thread contact assembly 38 extends downwardly from the end of upper arm 26. Likewise, a lower thread contact assembly 40 extends upwardly from the remote end of lower arm 28. In this position, upper arm 26 is preferably inclined upwardly from the upper block to its remote end at about 5° to 7°, and lower arm 28 is inclined downwardly an equal amount. This incline permits bearing pads 22, 24 to be positioned against the end of the pipe while providing adequate clearance for thread contact assemblies 38, 40 between the remote ends of the arms and the pipe threads.

Gage 10 is transformed into the internal thread measuring configuration shown in FIG. 4 by reversing the orientation of the upper and lower blocks 14, 16 on guide rails 12. In this configuration, upper thread contact assembly 38 extends upwardly from the remote end of upper arm 26 and lower thread contact assembly 40 extends downwardly from the remote end of lower arm 28. Again, the inclination of the upper and lower arms provides adequate clearance for upper and lower thread contact assemblies 38, 40.

Figure 7A:
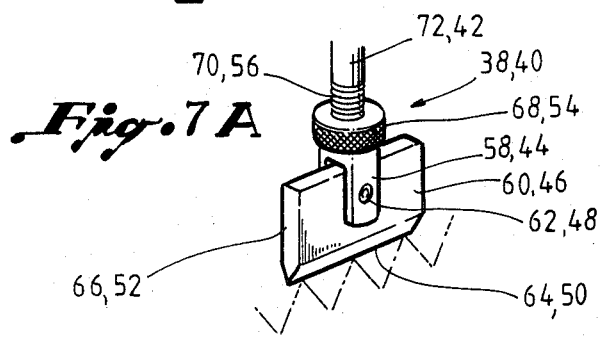
FIGS. 7A and 7B show alternative embodiments of a thread contact.

In reference to FIG. 7A, the preferred embodiment of lower thread contact assembly 40 has a post 42 threaded into and extending upwardly from lower arm 28. A yoke 44 is mounted on the end of post 42. A shoe 46 is pivotally mounted in yoke 44 by a pin 48. This permits shoe 46 to conform to the taper of the pipe. Shoe 46 has a thread contacting edge 50 and a side edge 52 facing the lower bearing pad 24. A locking nut 54 is threaded onto a threaded portion 56 of post 42 and can be tightened against yoke 44 to lock the position of the shoe assembly.

Upper thread contact assembly 38 likewise has a yoke 58, a shoe 60 pivotally mounted in the yoke on a pin 62, a thread contacting edge 64 and a side edge 66 of shoe 60, and a locking nut 68 threadably mounted on a threaded portion 70. However, unlike the post 42 of the lower thread contact assembly, the post for the upper thread contact assembly is a vertically reciprocable and downwardly biased plunger 72 which extends from a dial indicator 74. Dial indicator 74 is rigidly mounted on upper arm 26 by a sleeve 76 which is fitted into an aperture in the arm. Sleeve 76 is then locked into position by a binder nut and screw assembly 78. Plunger 72 reciprocates in sleeve 76, and its vertical movement is converted by indicator 74 into a dial reading.

As shown in FIG. 7A, shoes 46, 60 are dimensioned so that thread contacting surfaces 50, 64 touch at least three thread crests and in some cases four thread crests, depending upon the particular thread configuration. This assures that contacting surfaces 50, 64 are oriented to the taper of the thread.

Figure 5:
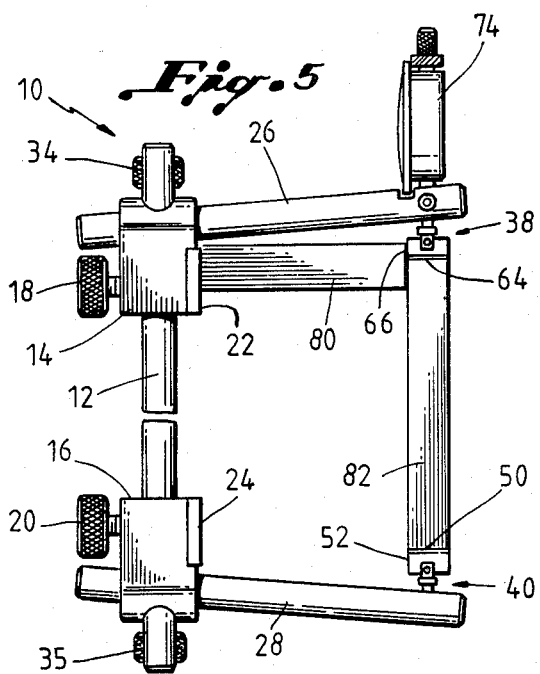
FIG. 5 is a side elevational view of the gage in the external thread measuring configuration showing the setting standards in position for setting the horizontal and vertical distances.
Figure 6:
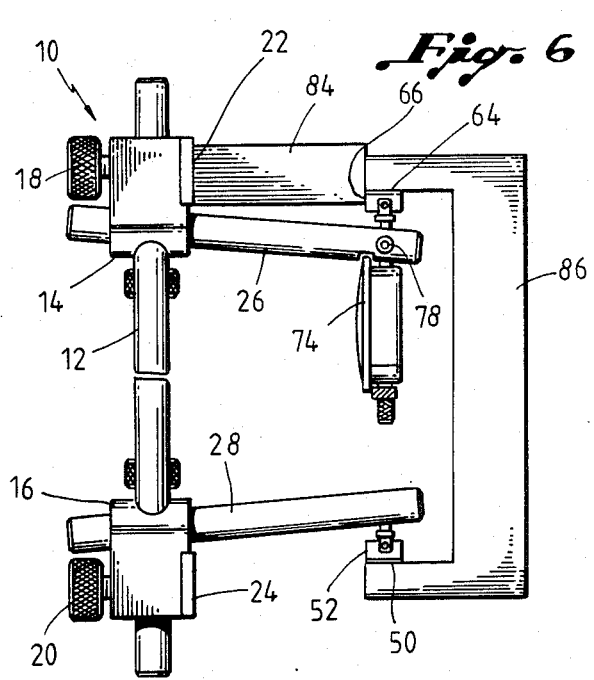
FIG. 6 is a side elevational view of the gage in the internal thread measuring configuration showing the setting standards in position for setting the horizontal and vertical distances.

Gage 10 is used to measure product threads by first setting thread contact assemblies 38, 40 to a position based on the pitch diameter and distance from the end of the pipe as specified by the API specification for the particular thread configuration to be measured. For this purpose, a set of gage block standards is used as shown in FIGS. 5 and 6. For external thread measurements as shown in FIG. 5, a horizontal distance gage block standard 80 and a diameter gage block standard 82 are required. Likewise, for measuring internal pipe threads as shown in FIG. 6, a horizontal distance gage block standard 84 and a diameter gage block standard 86 are required. Gage blocks 80, 82 and 84 are preferably cylinders ground to a precise lengthwise dimension. The standard 86 is generally U-shaped with the inside surfaces of the arms of the U ground for a precise arm to arm inside dimension.

Referring to the external thread configuration of FIG. 5, the horizontal position of upper and lower thread contact assemblies 38, 40 is set first. For the upper assembly, for example, this is done by loosening locking screw 34 so that upper arm 26 may slide in block 14. Horizontal gage block standard 80 is positioned between upper bearing pad 22 and side edge 66 of the upper shoe, and upper arm 26 is moved until side edge 66 of the upper shoe and bearing pad 22 are each positioned snugly against the opposed ends of block standard 80. Locking screw 34 is then tightened to lock the position of upper arm 26. This procedure is repeated for lower thread contact assembly 40. The same procedure also applied for the internal thread configuration of FIG. 6 using gage block standard 84.

Horizontal gage block standards 80 and 84 have a lengthwise dimension so that, when placed snugly between upper bearing pad 22 and side edge 66 of upper shoe 60 and between lower bearing pad 24 and side edge 52 of lower shoe 46, the horizontal distance from each bearing pad to the pivot point of the shoe will be equal to the distance from the pipe end to the plane at which the pitch diameter is measured as specified by the API specification for the particular thread configuration.

After the horizontal distances have been set, the vertical distance between upper and lower thread contacting edges 50, 64 is initially set using diameter gage block standards 82, 86 for external and internal configurations, respectively. Referring to the external thread configuration of FIG. 5, this is done by first loosening locking screws 18, 20 so that blocks 14, 16 can be moved to roughly position upper and lower arms 26, 28 at the desired distance apart. Upper shoe assembly 38 is then retracted by retracting plunger 72 into the dial indicator and block standard 82 is positioned between the upper and lower shoe assemblies. Upper shoe assembly 38 is released and is biased downwardly so that upper and lower thread contacting edges 50, 64 rest firmly against the opposed ends of block standard 82. In this position, plunger 72 is preferably about midway between its fully retracted and fully extended positions. The same procedure is also followed for the internal thread configuration of FIG. 6, except that thread contacting edges 50, 64 rest firmly against the inside of the arms of U-shaped block standard 86.

Because the thread contacting edges ride on the crests of the threads, rather than at the pitch line of the threads, standards 82, 86 are dimensioned to set the distance between the thread contacting edges to the pitch diameter dimension as specified by the API plus two times one-half the thread height, for externally threaded pipe, and minus two times one-half the thread height, for internally threaded pipe. Further, because shoes 46, 60 will pivot slightly to conform to the taper of the threads when brought into contact with the thread crests, diameter gage block standards 82, 86 must also take into account the slight change in distance between the thread contacting edges, along the line of the shoe pivot points, caused by this pivoting.

It may be appreciated that setting the thread contacts to the proper diametrical and horizontal dimensions is dependent upon the dimension of each shoe from the pivot point to its thread contacting edge and side edge. The shoes are therefore precision ground to obtain very exact dimensions. Further, the shoes can be replaced if the edges become worn with use.

While the shoes are in position with the block standard, dial indicator 74 is "zeroed." If the dial indicator has a balance dial, this means that the pointer of the indicator will initially be set to read zero. On the other hand, if a direct reading dial is used, the pointer of the indicator will initially be set to read the standard pitch diameter specified by the API specification.

At this point, gage 10 is placed over the end of the threaded product as shown in FIGS. 2 and 4 with bearing pads 22, 24 positioned against the end of the pipe. During this positioning operation, upper shoe assembly 38 is retracted by retracting dial indicator plunger 72. Thread contacting edge 50 of lower shoe 46 is placed in contact with the thread crests. Thread contacting edge 64 of upper shoe 60 is then also permitted to contact the thread crests by releasing plunger 72. To assure that the shoes are positioned on diametrically opposed positions on the threads, upper shoe 60 is moved circumferentially over the thread crests by pivoting gage 10 using thread contacting edge 50 of lower shoe 46 as the pivot point. Diametrically opposed positioning of the shoes can be confirmed by watching the movement of the pointer on the dial indicator. The proper position of the shoes is the point at which the pointer changes directions.

The dial indicator can then be read to obtain a direct measurement of pitch diameter. If the indicator is of the balance type, dial indicator 74 will show the deviation of the actual pitch diameter from the pitch diameter specified by the API specification. Because the various component parts of gage 10 are precision made, measurement accuracies of ±0.001 inches can be maintained.

From the foregoing discussion, it is clear that gage 10, which uses shoes to contact the thread crests, is measuring the crest to crest diameter of the threads, rather than the pitch diameter of the thread. However, the crest to crest diameter measurement is an adequate indication of pitch diameter in the great majority of circumstances. If confirmation is desired that the dimension between the pitch line and thread crest line is accurate, a standard "shave gage" may be used. This additional measurement confirms that the crest to crest measurement made by gage 10 gives an accurate verification of the pitch diameter.

By rotating pitch diameter gage 10 about the axis of the pipe, to position the shoes at various points about the circumference of the pipe, the out-of-roundness or ovality of the threads may be determined.

Because gage 10 is placed against the end of the pipe to be measured, some inaccuracy in the measurement will be introduced if the end of the pipe is not square in relation to the axis of the pipe. This problem also exists when using ring and plug gages. However, most machines for manufacturing threaded pipe today face off and thread the pipe in one operation, virtually eliminating the problem of out of square end faces. Even when these fabrication steps are carried out separately, the gage of the present invention can tolerate some deviation of the pipe end face without a loss of accuracy.

Figure 7B:
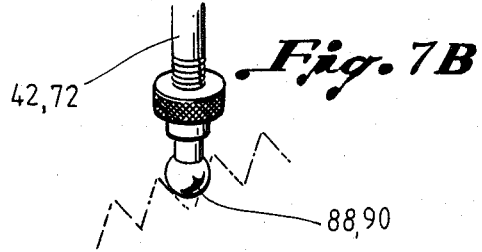

FIG. 7B shows an alternative embodiment of a thread contact. Lower ball contact 88 is mounted on the end of post 44 and upper ball contact 90 is mounted on the end of plunger 72. The ball contacts can be of such a size that they will sit in the thread valley between the crests, resting on the thread flanks at the pitch line.

It will be understood that a set of block standards 80, 82, 84 and 86 will be required which includes standards for each pipe configuration desired to be measured. Although this will result in a set of standards similar in number to a complete set of ring and plug standards, the standards required for the gage of the present invention can be fabricated at a small fraction of the cost of the ring and plug gages, which require much more machining to provide precision threads for these gages. This results in a gaging system, including gage 10 and a complete set of block standards 80, 82, 84 and 86, which can be produced for a small fraction of the cost of a complete set of rings and plugs.

In addition to API thread applications, the gage and method of this invention can also be used to measure premium threads. Further, the gage of the present invention can be sized for use with a wide range of external and internal thread diameters. By using a remote connection between the upper shoe assembly 38 and a remote dial indicator 74, gage 10 can be used on internal threads of very small diameters.

It will be appreciated that gage 10 can also be used on smooth surfaces to measure diameters at any desired distance from the end of the product. This is frequently done during fabrication of threaded pipe to check inside the outside diameters before machining the threads onto the pipe ends.

Further, gage 10 may be used on any product which has a portion on which inside or outside diameters are checked at a specified location.

The foregoing description has been directed to particular embodiments of the invention in accordance with the requirements of the patent statutes for the purposes of illustration and explanation. It will be apparent, however, to those skilled in this art, that many modifications and changes in the apparatus and method set forth will be possible without departing from the scope and spirit of the invention. It is intended that the following claims be interpreted to embrace all such modifications and changes.

What is claimed is:

1. A method of measuring the inside or outside pitch diameter of a straight or tapered threaded product at a selected distance from the end of the product comprising the steps of:

a. setting a predetermined horizontal distance between an upper pivotable flat thread contact surface and a vertical bearing surface and between a lower pivotable flat thread contact surface and the vertical bearing surface, the horizontal distance being measured in a vertical plane which is perpendicular to the bearing surface, the predetermined horizontal distance being based on the selected axial distance from the end of the product to the point on the product at which the diameter is to be measured;
b. initially setting the upper and lower thread contact surfaces a predetermined vertical distance apart based on a specified diameter at the selected axial distance;
c. placing the bearing surface against the end of the product;
d. bringing the flat thread contact surfaces into contact with the thread crests of the product in the area of the selected distance from the end of the product at diametrically opposed points on the product; and
e. measuring the difference between the vertical distance initially set and the vertical distance from the upper thread contact surface to the lower thread contact surface when in the thread crest contacting position.

2. The method of claim 1, wherein:
a. the predetermined horizontal distance between the upper and lower thread contact surfaces and the bearing surface is set using a setting standard accurately dimensioned to the predetermined horizontal distance; and
b. the predetermined vertical distance is set using a setting standard accurately dimensioned to the predetermined vertical distance.

3. The method of claim 1, wherein the thread contact surfaces are brought into contact with the thread crests by pivoting the contact surfaces about a horizontal axis perpendicular to the vertical plane until they rest on the thread crests.

4. The method of claim 1 or 2, wherein for measuring an outside diameter the thread contact surfaces face toward each other.

5. The method of claim 4, wherein the difference between the initially set vertical distance and the vertical distance from the upper thread contact surface to the lower thread contact surface in the thread crest contacting position is measured by a dial indicator in communication with the upper thread contact surface, the upper thread contact surface being vertically movable from its initially set vertical position to the thread crest contacting position, the dial indicator being capable of indicating the vertical distance travelled by the upper thread contact surface from its initially set vertical position to its thread crest contacting position.

6. The method of claim 1 or 2, wherein for measuring the inside diameter the thread contact surfaces face away from each other.

7. The method of claim 6, wherein the difference between the initially set vertical distance and the vertical distance from the upper thread contact surface to the lower thread contact surface in the thread crest contacting position is measured by a dial indicator in communication with the upper thread contact surface, the upper thread contact surface being vertically movable from its initially set vertical position to the thread crest contacting position, the dial indicator being capable of indicating the vertical distance travelled by the upper thread contact surface from its initially set vertical position to its thread crest contacting position.

8. The method of claim 1 or 2, wherein the difference between the initially set vertical distance and the vertical distance from the upper thread contact surface to the lower thread contact surface in the thread crest contacting position is measured by a dial indicator in communication with the upper thread contact surface, the upper thread contact surface being vertically movable from its initially set vertical position to the thread crest contacting position, the dial indicator being capable of indicating the vertical distance travelled by the upper thread contact surface from its initially set vertical position to its thread crest contacting position.

9. A gage for measuring the inside or outside pitch diameter of a straight or tapered threaded product at a selected distance from the end of the product comprising:
   a. a vertical bearing surface contactable with the end of the product;
   b. upper and lower flat thread contact surfaces lying in a vertical plane perpendicular to the bearing surface and being horizontally spaced therefrom, at least one of the contact surfaces being movable vertically in the plane to vary the vertical distance between the thread contact surfaces, the flat thread contact surfaces being contactable with the crests of the threads in the area of the selected distance from the end of the product, the flat contact surfaces being pivotable in the vertical plane;
   c. means for adjusting the horizontal distance between the bearing surface and the upper and lower thread contact surfaces;
   d. means for locking the horizontal distance from the bearing surface to the upper thread contact surface and to the lower thread contact surface, the horizontal distance being measured in the vertical plane in which the thread contact surfaces lie and being based on the selected distance from the end of the product; and
   e. means for measuring the difference between an initial vertical distance between the upper and lower thread contact surfaces based on the specified diameter at the selected distance from the end of the product and the distance between the upper and lower thread contact surfaces in a thread crest contacting position.

10. The gage of claim 9, wherein the measuring means comprises a dial indicator in communication with the upper thread contact surface, the upper thread contact surface being vertically movable, the dial indicator being capable of indicating the vertical distance travelled by the upper thread contact surface.

11. The gage of claim 9, wherein each thread contact surface is a flat edge of a shoe pivotable about a horizontal axis lying in a plane parallel to the vertical plane of the bearing surface.

12. A gage for measuring the inside or outside pitch diameter of a straight or tapered threaded product at a selected distance from the end of the product comprising:
   a. a pair of parallel, elongated vertical guide rails;
   b. an upper block and a lower block each mounted on and slidable along the guide rails;
   c. means for locking the upper and lower blocks in a desired position on the guide rails;
   d. a substantially flat bearing surface on both the upper block and the lower block, the bearing surfaces lying in the same vertical plane and being contactable with the end of a product to be measured;
   e. an upper arm slidably mounted in and extending in a horizontal direction from the upper block and a lower arm slidably mounted in and extending in a horizontal direction from the lower block, the upper and lower arms lying in a vertical plane which is perpendicular to the vertical plane of the bearing surfaces;
   f. means for locking the upper arm and the lower arm in a desired position relative to the upper block and the lower block, respectively;
   g. a pair of flat thread contact surfaces, an upper thread contact surface depending from an end of the upper arm remote from the upper block and a lower thread contact surface depending from an end of the lower arm remote from the lower block, the thread contact surfaces being contactable with the thread crests of the product in the area of the selected distance from the end of the product at diametrically opposed points on the threaded product, the vertical distance between the thread contact surfaces being initially setable to a distance based on a specified diameter at the selected distance, and the horizontal distance from the upper thread contact surface to the upper bearing surface and the horizontal distance from the lower thread contact surface to the lower bearing surface being setable to a distance based on the horizontal distance from the end of the product at which the diameter is to be measured, the thread contact surfaces being pivotable in the vertical plane in which the arms lie; and
   h. means for measuring the difference between the initially set vertical distance and the vertical distance between the thread contact surfaces when in the thread crest contacting position.

13. The gage of claim 12, wherein:
   a. the locking means for locking the upper and lower blocks comprises a pair of screws threaded into both the upper block and the lower block to bear against the guide rails, one screw corresponding to each of the guide rails;
   b. the locking means for locking the upper and lower arms comprises a screw threaded into both the upper block and the lower block to bear against the upper arm and lower arm, respectively; and
   c. the measuring means comprises a dial indicator rigidly mounted on the upper arm at the remote end, the dial indicator having a reciprocable plunger extending vertically therefrom, the upper thread contact surface being mounted on the plunger.

14. The gage of claim 12 or 13, wherein the upper and lower blocks may be reversed on the guide rails between an outside diameter measuring position in which the thread contact surfaces extend from the arms vertically toward each other and an inside diameter measuring position in which the thread contact surfaces extend from the arms vertically away from each other.

15. The gage of claim 14, wherein each thread contact surface is a flat edge of a shoe pivotable about a horizontal axis lying in a plane parallel to the vertical plane of the bearing surfaces.

16. The gage of claim 12 or 13, wherein each thread contact surface is a flat edge of a shoe pivotable about a horizontal axis lying in a plane parallel to the vertical plane of the bearing surfaces.

17. The gage of claim 9 or 12, wherein the thread contact surfaces are of such a length as to contact about 3 or 4 thread crests.

18. The gage of claim 12, wherein the upper arm and the lower arm also extend in a vertical direction to permit the arms to more closely follow the taper of a tapered threaded product.

19. A gage for measuring the inside or outside pitch diameter of a straight or tapered threaded product at a selected distance from the end of the product comprising:
   a. a vertical bearing surface contactable with the end of the product;
   b. upper and lower pivotable flat thread contact surfaces lying in a vertical plane, the vertical plane being perpendicular to the vertical bearing surface, the thread contact surfaces both being spaced from the vertical bearing surface at a horizontal distance based on the selected distance from the end of the product, the vertical distance between the upper thread contact surface and the lower thread contact surface being variable from an initial vertical distance based on the specified diameter at the selected distance to a vertical distance in which the upper and lower thread contact surfaces are in contact with the thread crests of the product at diametrically opposed points thereon; and
   c. means for registering the difference between the initial vertical distance and the vertical distance between the upper and lower thread contact surfaces when in contact with the thread crests of the product at diametrically opposed points thereon.

20. The gage of claim 19, wherein the registering means comprises a dial indicator in communication with the upper thread contact surface, the upper thread contact surface being vertically movable, the dial indicator being capable of registering the vertical distance travelled by the upper thread contact surface.

21. The gage of claim 19 or 20, further comprising means for varying the horizontal distance between the vertical bearing surface and the upper and lower thread contact surfaces.

* * * * *